(12) United States Patent
Ohishi et al.

(10) Patent No.: US 10,608,516 B2
(45) Date of Patent: Mar. 31, 2020

(54) POWER GENERATION DEVICE

(71) Applicant: Panasonic Intellectual Property Management Co., Ltd., Osaka (JP)

(72) Inventors: Suguru Ohishi, Osaka (JP); Kensuke Toda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 264 days.

(21) Appl. No.: 15/548,575

(22) PCT Filed: Feb. 15, 2016

(86) PCT No.: PCT/JP2016/000754
§ 371 (c)(1),
(2) Date: Aug. 3, 2017

(87) PCT Pub. No.: WO2016/143262
PCT Pub. Date: Sep. 15, 2016

(65) Prior Publication Data
US 2018/0019652 A1  Jan. 18, 2018

(30) Foreign Application Priority Data

Mar. 9, 2015  (JP) ................................ 2015-046355

(51) Int. Cl.
*H02K 35/02* (2006.01)
*H02K 35/04* (2006.01)
(Continued)

(52) U.S. Cl.
CPC ............. *H02K 35/02* (2013.01); *H02K 35/04* (2013.01); *H02K 7/1869* (2013.01); *H02K 7/1876* (2013.01); *H02K 35/00* (2013.01)

(58) Field of Classification Search
CPC ........ H02K 35/00; H02K 35/02; H02K 35/04; H02K 35/06; H02K 7/1869; H02K 7/1876; H02K 7/1892
(Continued)

(56) References Cited

U.S. PATENT DOCUMENTS 6,407,654 B1\* 6/2002 Saito .................... H01H 51/229
335/80
2008/0315595 A1\* 12/2008 Bataille .................. H02K 35/02
290/1 R
(Continued)

FOREIGN PATENT DOCUMENTS

| WO | 2011/069879 A1 | 6/2011 |
| WO | 2013/084409 A1 | 6/2013 |
| WO | 2014/061225 A1 | 4/2014 |

OTHER PUBLICATIONS

International Search Report issued in Application No. PCT/JP2016/000754 dated May 17, 2016, with English translation.

*Primary Examiner* — Jermele M Hollington
*Assistant Examiner* — Alexander A Singh
(74) *Attorney, Agent, or Firm* — McDermott Will & Emery LLP

(57) ABSTRACT

A power generation device includes a first magnetic body including a side surface that makes contact with or separates from the first side surface of the yoke, a second magnetic body including a side surface that makes contact with or separates from the second side surface of the yoke, and a magnet including a first magnetic pole face and a second magnetic pole face that has a magnetic pole different from a magnetic pole of the first magnetic pole face. The first magnetic pole face is attracted to the attraction surface of the first magnetic body, the second magnetic pole face is attracted to the attraction surface of the second magnetic body, and at least one of the first magnetic body and the
(Continued)

second magnetic body rotates in a state of being attracted to the magnet.

9 Claims, 14 Drawing Sheets

(51) Int. Cl.
*H02K 35/00* (2006.01)
*H02K 7/18* (2006.01)

(58) Field of Classification Search
USPC .......... 310/36, 37, 152, 12.01, 12.12, 12.15, 310/12.21, 12.31
See application file for complete search history.

(56) References Cited

U.S. PATENT DOCUMENTS

| | | | |
|---|---|---|---|
| 2014/0210290 A1* | 7/2014 | Tsukanaka | H02K 21/14 310/91 |
| 2014/0285296 A1 | 9/2014 | Nagahara et al. | |
| 2015/0279598 A1 | 10/2015 | Matsumoto et al. | |

* cited by examiner

FIG. 13
PRIOR ART
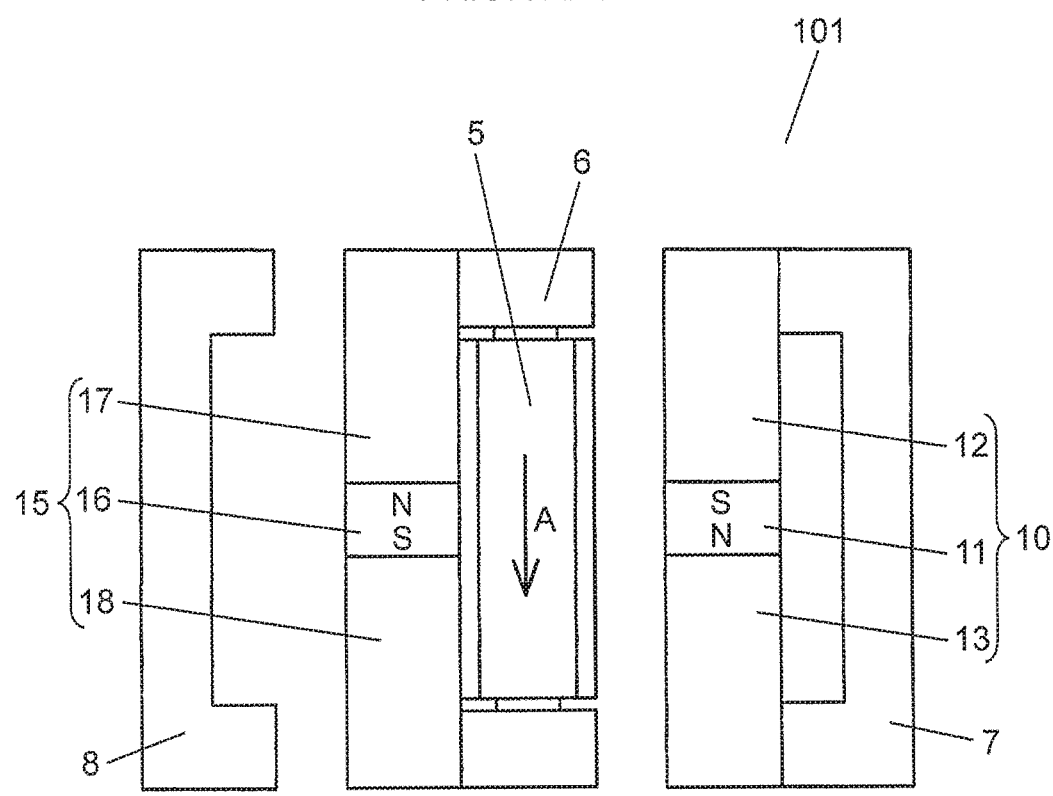
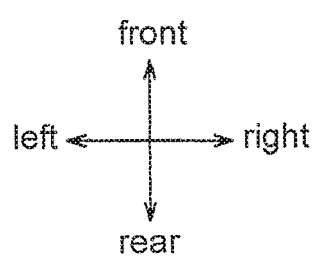

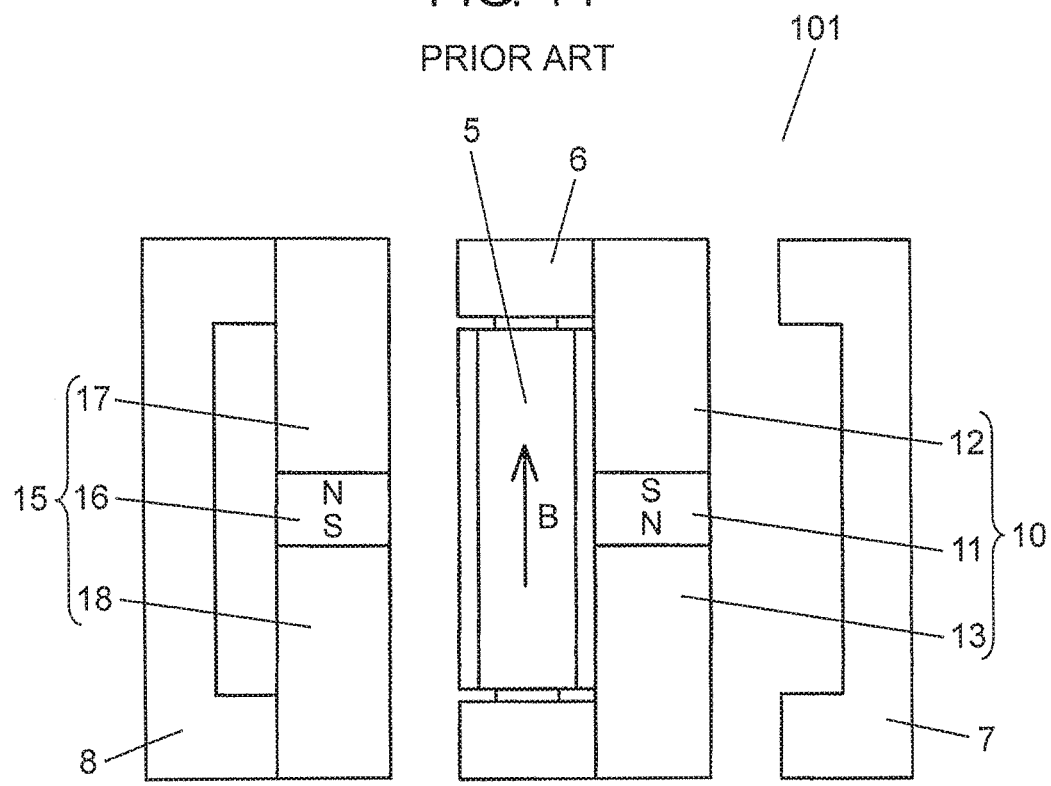
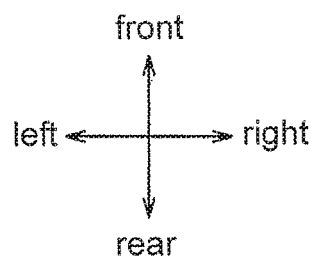

POWER GENERATION DEVICE

RELATED APPLICATIONS

This application is the U.S. National Phase under 35 U.S.C. § 371 of International. Application No. PCT/JP2016/000754, filed on Feb. 15, 2016, which in turn claims the benefit of Japanese Application No. 2015-046355, filed on Mar. 9, 2015, the disclosures of which are incorporated by reference herein.

TECHNICAL FIELD

The present disclosure relates to a power generation device used in various electronic devices, devices for remotely manipulating the electronic devices, and manipulation units.

BACKGROUND ART

In recent years, development of a small-sized power generation device has been desired for various electronic devices, devices for remotely manipulating the electronic devices, and manipulation units.

A conventional power generation device will now be described with reference to FIGS. 11 to 14.

FIG. 11 is an external perspective view of conventional power generation device 100, FIG. 12 is a top view of conventional power generation device 100 with upper case 2 removed, FIG. 13 illustrates a first state of magnetic circuit 101 of conventional power generation device 100, and FIG. 14 illustrates a second state of magnetic circuit 101 of conventional power generation device 100.

Conventional power generation device 100 includes magnetic circuit 101 (see FIGS. 13 and 14). Housing 102 illustrated in FIG. 11 has a box-shape which is formed of assembled resin lower case 1 and resin upper case 2. Knob 3 for manipulation projects from a side surface of housing 102. As illustrated in FIG. 12, magnetic circuit 101 is accommodated in housing 102. By sliding knob 3 in the right-and-left direction, the state of magnetic circuit 101 housed in power generation device 100 transitions to either the first state illustrated in FIG. 13 or the second state illustrated in FIG. 14.

As illustrated in FIGS. 13 and 14, magnetic circuit 101 includes bar-shaped central yoke 6, bar-shaped magnetic member 10, and bar-shaped magnetic member 15. Coil 5 is wound around bar-shaped central yoke 6. Magnetic member 10 and magnetic member 15 are disposed such that their magnetic poles are opposite to each other. Central yoke 6 is disposed between magnetic member 10 and magnetic member 15.

Magnetic member 10 is formed of magnet 11, square-column magnetic body 12, and square-column magnetic body 13. Magnetic body 12 is bonded to the front surface of magnet 11, and magnetic body 13 is bonded to rear surface of magnet 11. Magnet 11 is disposed such that a side on the magnetic body 12 side (front side) is an S-pole and a side on the magnetic body 13 side (rear side) is an N-pole. Magnetic member 15 is configured in a manner similar to magnetic member 10. However, magnet 16 is disposed such that a side on the magnetic body 17 side (front side) is an N-pole and a side on the magnetic body 18 side (rear side) is an S-pole.

Central yoke 6, magnetic member 10, and magnetic member 15 are disposed between auxiliary yoke 7 and auxiliary yoke 8.

As illustrated in FIG. 12, central yoke 6, auxiliary yoke 7, and auxiliary yoke 8 are fixed in housing 102 and restricted to move in the right-and-left direction. Magnetic member 10 and magnetic member 15 are fixed to drive member 4.

Drive member 4 is supported so as to be movable in the right-and-left direction in housing 102. Drive member 4 is connected to knob 3 and moves in the right-and-left direction by sliding knob 3. By moving magnetic member 10 and magnetic member 15 which are supported by drive member 4 in the right-and-left direction, the state of magnetic circuit 101 transitions to either the first state (illustrated in FIG. 13) or the second state (illustrated in FIG. 14).

In the first state, magnetic member 15 is in contact with central yoke 6 as illustrated in FIG. 13. In the first state, a magnetic flux flows through central yoke 6 in a direction indicated by arrow A (from the front side to the rear side).

Meanwhile, in the second state, magnetic member 10 is in contact with central yoke 6 as illustrated in FIG. 14. In the second state, a magnetic flux flows through central yoke 6 in a direction indicated by arrow B (from the rear side to the front side).

The state of magnetic circuit 101 changes from the first state to the second state by sliding knob 3 for manipulation. By this change in the state, the direction of the magnetic flux that flows through central yoke 6 is reversed. This change in the magnetic flux generates an electromotive force in coil 5. That is, power generation device 100 generates power by causing the state of magnetic circuit 101 to transition from the first state to the second state.

For example, PTL 1 is known as prior art literature information related to this application.

CITATION LIST

Patent Literature

PTL1: WO 2013/084409 A

SUMMARY OF THE INVENTION

A power generation device of the present disclosure includes a yoke around which a coil is wound, and the yoke has a first side surface located on a first direction side with respect to the coil and a second side surface located on a second direction side with respect to the coil. The second direction is opposite the first direction. Furthermore, the power generation device includes a first magnetic body including a side surface that makes contact with or separates from the first side surface of the yoke, a second magnetic body including a side surface that makes contact with or separates from the second side surface of the yoke, and a magnet including a first magnetic pole face and a second magnetic pole face that has a magnetic pole different from a magnetic pole of the first magnetic pole face. The first magnetic pole face of the magnet is attracted to an attraction surface of the first magnetic body, the second magnetic pole face of the magnet is attracted to an attraction surface of the second magnetic body, and at least one of the first magnetic body and the second magnetic body rotates in a state of being attracted to the magnet.

BRIEF DESCRIPTION OF DRAWINGS

FIG. 13 illustrates a first state of a magnetic circuit of the conventional power generation device.

FIG. 14 illustrates a second state of the magnetic circuit of the conventional power generation device.

DESCRIPTION OF EMBODIMENTS

Prior to description of the present exemplary embodiment, a conventional power generation device will now be described.

Conventional power generation device 100, which has been described with reference to FIGS. 11 to 14, includes magnetic circuit 101 that changes a direction of a magnetic flux flowing through central yoke 6. Magnetic circuit 101 produces an electromotive force by Faraday's law. The power generation device is thus desired to generate stable power with small fluctuation.

Power generation device 200 of the present disclosure can provide stable power generation since the fluctuation of change in the magnetic flux flowing through a yoke disposed in a center is small.

The present exemplary embodiment will now be described with reference to FIGS. 1 to 10.

Exemplary Embodiment

Figure 1:
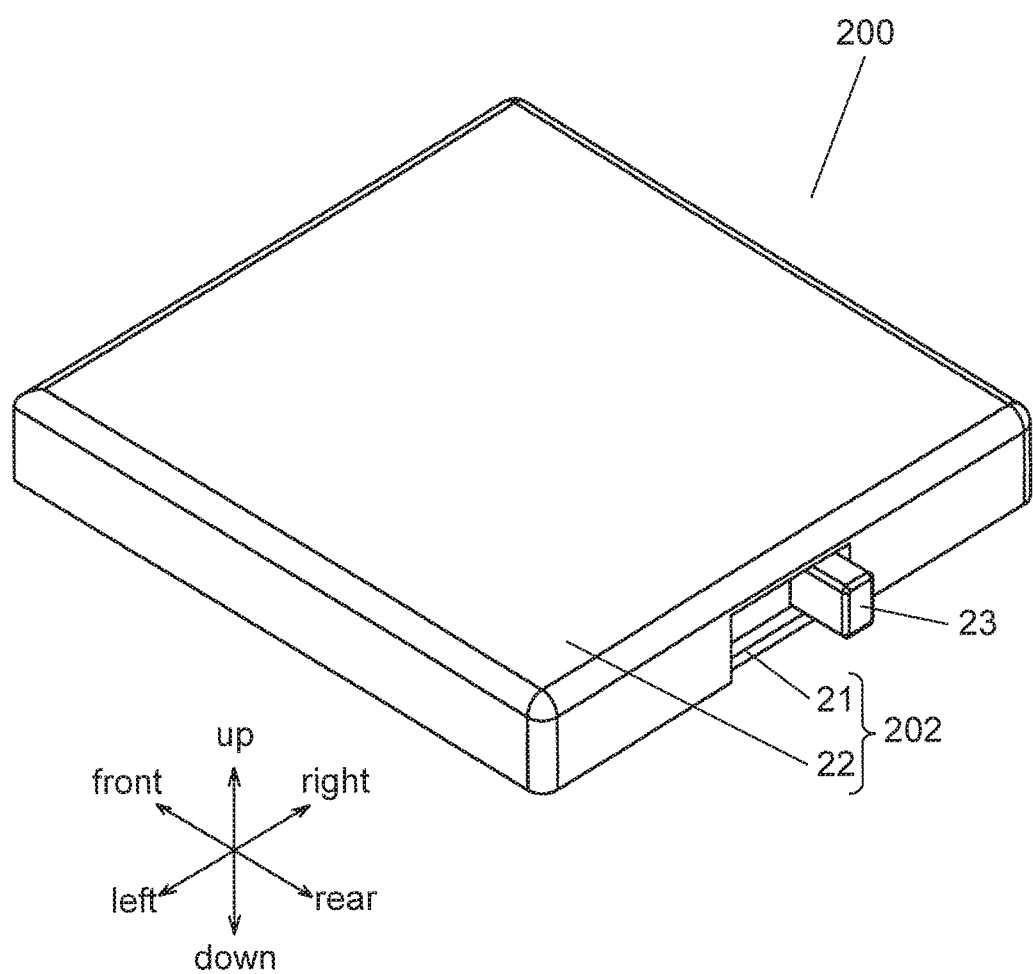
FIG. 1 is an external perspective view of a power generation device according to an exemplary embodiment.
Figure 2:
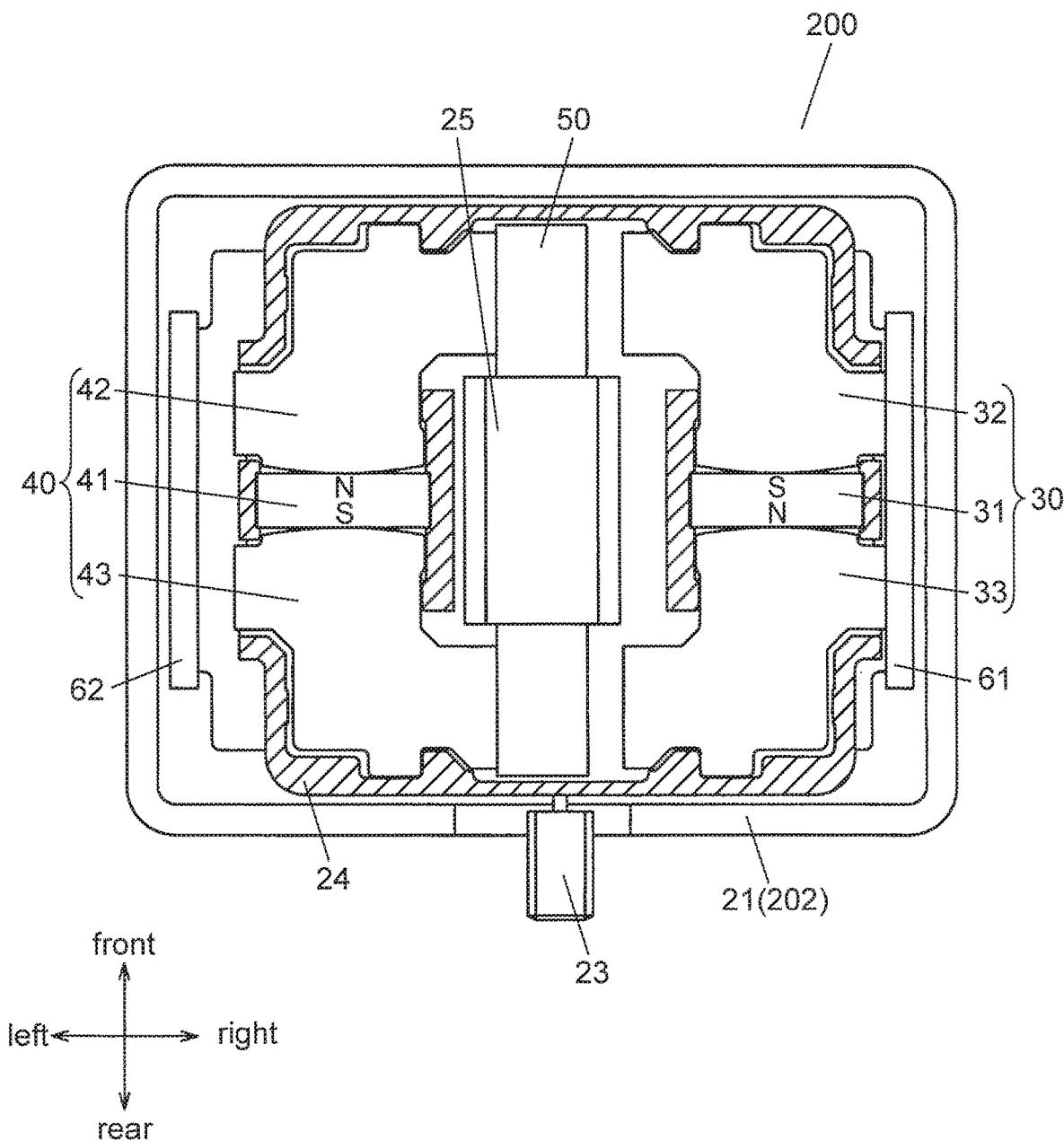
FIG. 2 is a top view of the power generation device according to the exemplary embodiment with a case removed.
Figure 3:
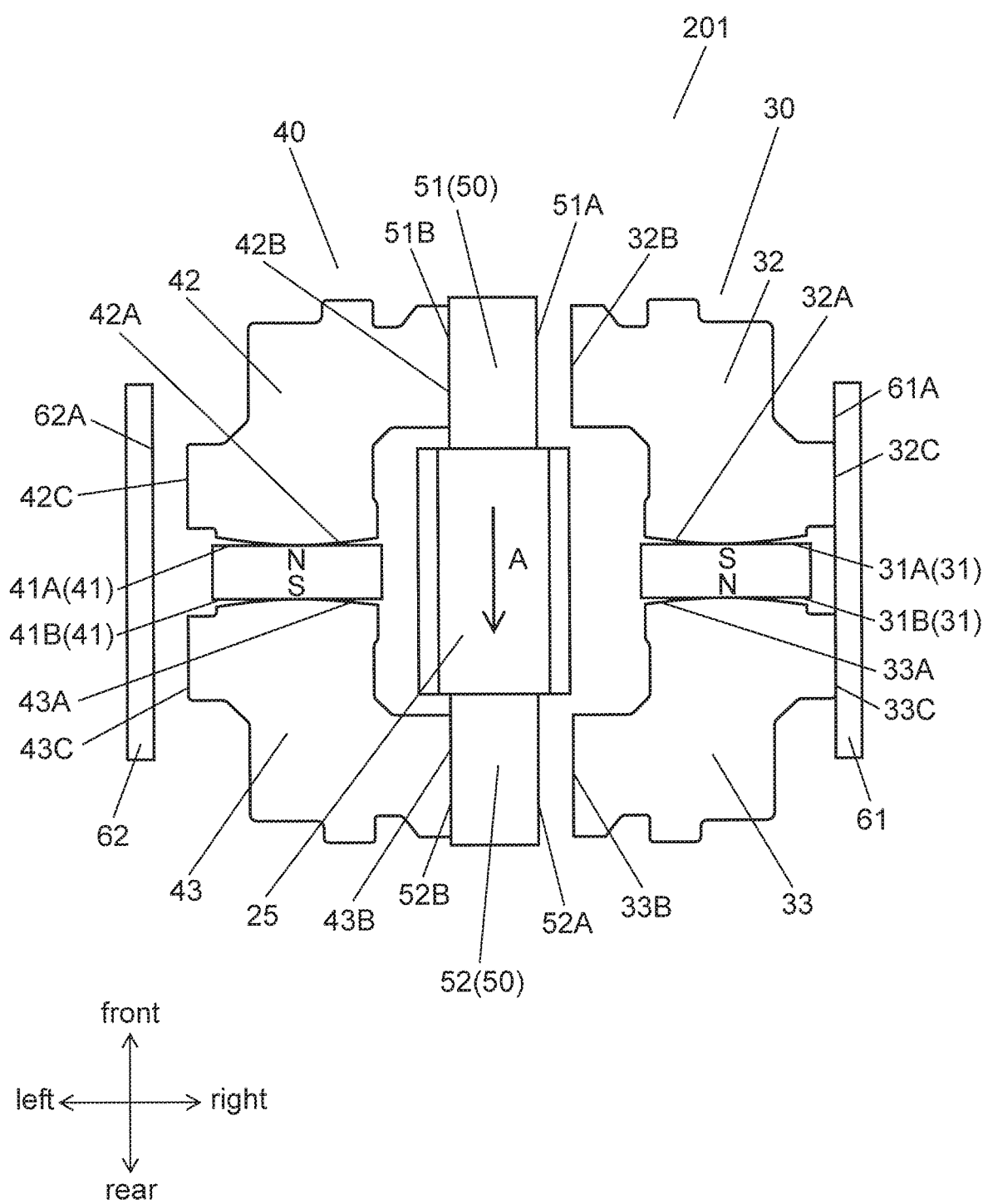
FIG. 3 illustrates a first state of a magnetic circuit according to the exemplary embodiment.
Figure 4:
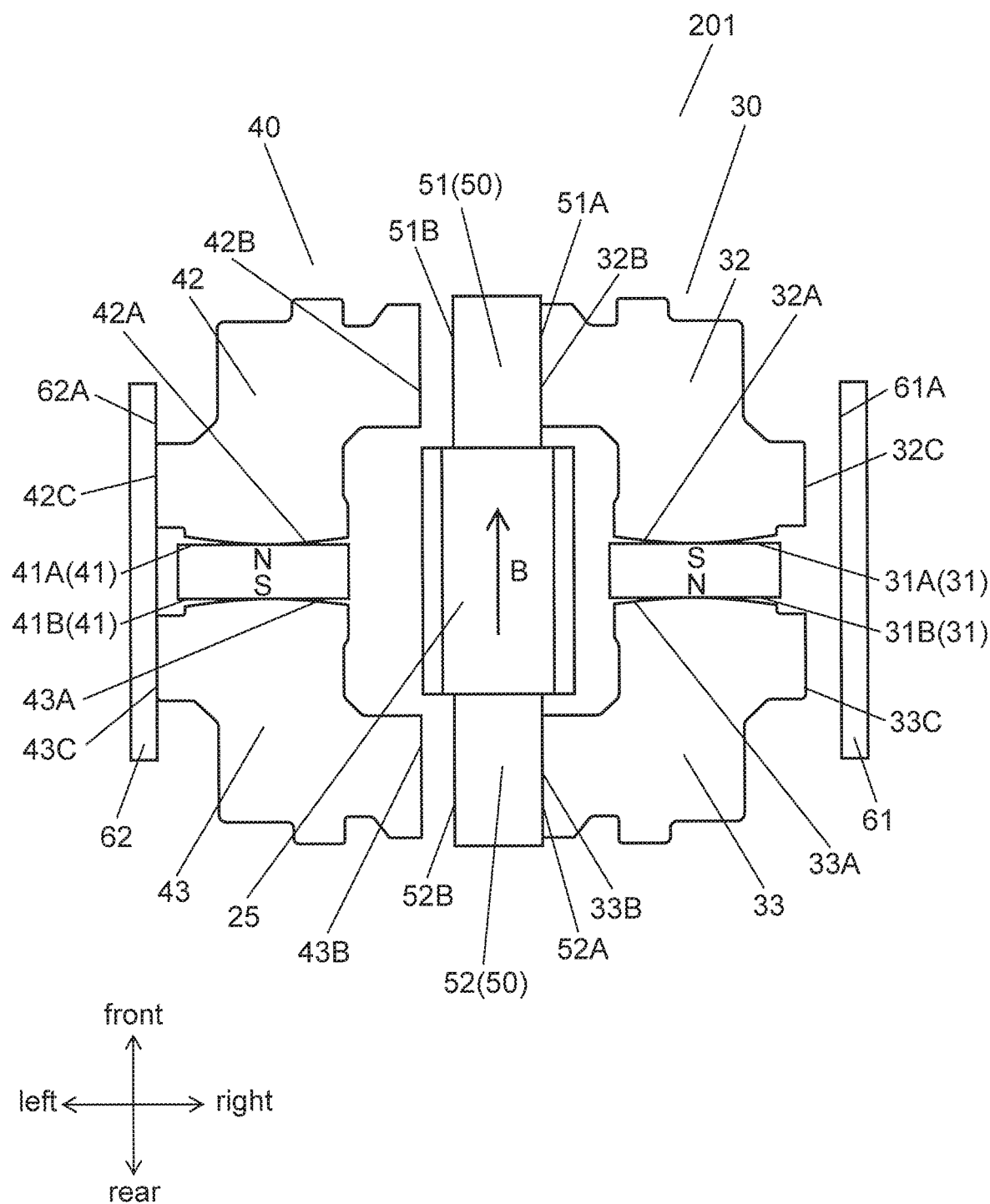
FIG. 4 illustrates a second state of the magnetic circuit according to the exemplary embodiment.

FIG. 1 is an external perspective view of power generation device 200 according to an exemplary embodiment, FIG. 2 is a top view of power generation device 200 according to the exemplary embodiment with upper case 22 removed, FIG. 3 illustrates a first state of magnetic circuit 201, and FIG. 4 illustrates a second state of magnetic circuit 201.

Power generation device 200 includes magnetic circuit 201. As illustrated in FIGS. 3 and 4, magnetic circuit 201 includes bar-shaped central yoke 50 around which coil 25 is wound, and magnetic member 30.

As illustrated in FIG. 2, magnetic member 30 includes magnet 31, magnetic body 32, and magnetic body 33. Magnet 31 has a form of a rectangular solid and is disposed with an S-pole in a front surface and an N-pole in a rear surface. Magnetic body 32 having an L-shape in a top view is attracted to the front surface of magnet 31, and magnetic body 33 having an L-shape in a top view is attracted to the rear surface of magnet 31. Each of magnetic body 32 and magnetic body 33 is rotatable with respect to magnet 31. Although the present exemplary embodiment has rotatable magnetic body 32 and rotatable magnetic body 33, it is not required that both the magnetic body 32 and magnetic body 33 are rotatable.

As illustrated in FIGS. 3 and 4, the state of magnetic member 30 transitions to either a state being separated from central yoke 50 (hereinafter referred to as "a first state") or a state in contact with central yoke 50 (hereinafter referred to as "a second state"). Transition in the state changes the magnetic flux flowing through central yoke 50 and thereby generates an electromotive force in coil 25.

With magnetic body 32 and magnetic body 33 being supported in a manner rotatable with respect to magnet 31, magnetic member 30 corrects, along the rotating direction, positions of a contact surface of magnetic body 32 (side surface 32B) and a contact surface of magnetic body 33 (side surface 33B) which make contact with central yoke 50. Thus, a gap is hardly generated between magnetic body 32 and central yoke 50 as well as between magnetic body 33 and central yoke 50. That is, in power generation device 200, a gap is hardly generated between magnetic member 30 and central yoke 50.

A detailed configuration and an operation of power generation device 200 will now be described.

<Configuration of Power Generation Device 200>

As illustrated in FIGS. 1 and 2, housing 202 has a form of a box and is formed of assembled resin lower case 21 and resin upper case 22. Housing 202 includes therein magnetic circuit 201.

As illustrated in FIG. 2, knob 23 projecting from a side surface of housing 202 is connected to drive member 24 supporting magnetic member 30 and magnetic member 40. By sliding knob 23 in the right-and-left direction, the state of magnetic circuit 201 can be caused to transition to either the first state illustrated in FIG. 3 or the second state illustrated in FIG. 4.

As illustrated in FIGS. 2 to 4, magnetic circuit 201 includes coil 25, central yoke 50, magnetic member 30, magnetic member 40, auxiliary yoke 61, and auxiliary yoke 62.

In the following description, a direction along the longitudinal direction of central yoke 50 is defined as the front-and-rear direction and a direction perpendicular to the front-and-rear direction in a top view is defined as the right-and-left direction.

Central yoke 50 is a bar-shaped magnetic body extending in the front-and-rear direction. Coil 25 is wound around central yoke 50. Magnetic member 30 and magnetic member 40 each have a U-shape in a top view. Central yoke 50 is disposed between magnetic member 30 and magnetic member 40.

Magnetic member 30 includes magnet 31, magnetic body 32, and magnetic body 33.

A front surface of rectangular-solid-shaped magnet 31 (magnetic pole face 31A) attracts magnetic body 32. Similarly, the rear surface of magnet 31 (magnetic pole face 31B) attracts magnetic body 33. Magnet 31 is disposed such that magnetic pole face 31A is the S-pole and magnetic pole face 31B is the N-pole.

Magnetic member 40 includes magnet 41, magnetic body 42, and magnetic body 43.

The front surface of rectangular-solid-shaped magnet 41 (magnetic pole face 41A) attracts magnetic body 42. Similarly, the rear surface of magnet 41 (magnetic pole face 41B)

attracts magnetic body 43. Magnet 41 is disposed such that magnetic pole face 41A is the N-pole and magnetic pole face 41B is the S-pole.

Auxiliary yoke 61 and auxiliary yoke 62 are rectangular-solid-shaped magnetic bodies extending in the front-and-rear direction. Central yoke 50, magnetic member 30, and magnetic member 40 are disposed between auxiliary yoke 61 and auxiliary yoke 62.

In auxiliary yoke 61 and auxiliary yoke 62, surfaces opposed to each other are respectively defined as plane 61A and plane 62A. That is, plane 61A of auxiliary yoke 61 is opposed to magnetic member 30, while plane 62A of auxiliary yoke 62 is opposed to magnetic member 40.

As illustrated in FIG. 2, central yoke 50, auxiliary yoke 61, and auxiliary yoke 62 are fixed in housing 202. Drive member 24 is supported so as to be movable in the right-and-left direction in housing 202. Drive member 24 is illustrated with hatching in FIG. 2. Magnetic member 30 and magnetic member 40 are supported by drive member 24. That is, magnetic member 30 and magnetic member 40 move in the right-and-left direction in conjunction with movement of drive member 24 in the right-and-left direction. By this movement, the state of magnetic circuit 201 transitions to either the first state illustrated in FIG. 3 or the second state illustrated in FIG. 4.

In the first state, as illustrated in FIG. 3, magnetic member 30 and magnetic member 40 are located on the right side. In the first state, magnetic member 30 and central yoke 50 are separated from each other and magnetic member 40 and central yoke 50 are in contact with each other. Magnetic member 30 and auxiliary yoke 61 are in contact with each other and magnetic member 40 and auxiliary yoke 62 are separated from each other.

That is, in the first state, a magnetic flux of magnet 41 of magnetic member 40 flows through central yoke 50. The magnetic flux thus flows through central yoke 50 from the front side to the rear side as indicated by arrow A in FIG. 3. In the first state, since magnetic member 30 and auxiliary yoke 61 are in contact with each other, a magnetic flux of magnet 31 flows through auxiliary yoke 61. Therefore, the magnetic flux of magnet 31 does not have much effect on the magnetic flux flowing through central yoke 50.

In the second state, as illustrated in FIG. 4, magnetic member 30 and magnetic member 40 are located on the left side. In the second state, magnetic member 30 and central yoke 50 are in contact with each other and magnetic member 40 and central yoke 50 are separated from each other. Magnetic member 30 and auxiliary yoke 61 are separated from each other and magnetic member 40 and auxiliary yoke 62 are in contact with each other.

That is, in the second state, the magnetic flux of magnet 31 of magnetic member 30 flows through central yoke 50. The magnetic flux thus flows through central yoke 50 from the rear side to the front side as indicated by arrow B in FIG. 4. In the second state, since magnetic member 40 and auxiliary yoke 62 are in contact with each other, the magnetic flux of the magnet 41 flows through auxiliary yoke 62. Therefore, the magnetic flux of the magnet 41 does not have much effect on the magnetic flux flowing through central yoke 50.

By changing the state of magnetic circuit 201 from the first state to the second state, for example, by sliding knob 23, the direction of the magnetic flux flowing through the central yoke 50 is reversed. This change in the magnetic flux generates an electromotive force in coil 25.

That is, power generation device 200 generates power by causing the state of magnetic circuit 201 to transition from the first state to the second state. Power generation device 200 also generates power in a similar manner by causing the state to transition from the second state to the first state.

<Configuration of Magnetic Circuit 201>

As illustrated in FIGS. 3 and 4, magnetic circuit 201 includes coil 25, central yoke 50, magnetic member 30, magnetic member 40, auxiliary yoke 61, and auxiliary yoke 62.

[Configuration of Central Yoke 50 and Auxiliary Yokes 61 and 62]

Central yoke 50 includes front portion 51 having a form of a square-column and located on the front side with respect to coil 25, and rear portion 52 having a form of a square-column and located on the rear side with respect to coil 25. A right side surface of front portion 51 is defined as side surface 51A, and a left side surface of front portion 51 is defined as side surface 51B. Side surface 51A and side surface 51B are facing opposite sides. A right side surface of rear portion 52 is defined as side surface 52A, and a left side surface of rear portion 52 is defined as side surface 52B. Side surface 52A and side surface 52B are facing opposite sides. Side surfaces 51A, 52A, 51B, and 52B are planar.

Auxiliary yoke 61 and auxiliary yoke 62 are rectangular-solid-shaped magnetic bodies extending in the front-and-rear direction. A left surface of auxiliary yoke 61 is defined as plane 61A. A right surface of auxiliary yoke 62 is defined as plane 62A. That is, plane 61A of auxiliary yoke 61 is opposed to magnetic member 30. Plane 62A of auxiliary yoke 62 is opposed to magnetic member 40. Each of plane 61A and plane 62A is planar.

[Configuration of Magnetic Member 30]

Magnetic member 30 includes magnet 31, magnetic body 32, and magnetic body 33. Magnet 31 has a form of a rectangular solid. A surface on the front side which is the S-pole is defined as magnetic pole face 31A, and a surface on the rear side which is the N-pole is defined as magnetic pole face 31B.

Magnetic body 32 and magnetic body 33 are L-shaped magnetic bodies. One of distal ends of magnetic body 32 and one of distal ends of magnetic body 33 are attracted to magnet 31. The other distal end of magnetic body 32 and the other distal end of magnetic body 33 are opposed to central yoke 50. The dimensions in the up-and-down direction (thickness) of magnetic body 32 and magnetic body 33 are as large as that of magnet 31.

A surface of magnetic body 32 attracted to magnetic pole face 31A of magnet 31 is defined as attraction surface 32A. A surface of magnetic body 32 opposed to side surface 51A of central yoke 50 is defined as side surface 32B. A surface of magnetic body 32 opposed to plane 61A of auxiliary yoke 61 is defined as opposing surface 32C. Side surface 32B and opposing surface 32C are planar.

A surface of magnetic body 33 attracted to magnetic pole face 31B of magnet 31 is defined as attraction surface 33A. A surface of magnetic body 33 opposed to side surface 52A of central yoke 50 is defined as side surface 33B. A surface of magnetic body 33 opposed to plane 61A of auxiliary yoke 61 is defined as opposing surface 33C. Side surface 33B and opposing surface 33C are planar.

[Configuration of Magnetic Member 40]

Magnetic member 40 includes magnet 41, magnetic body 42, and magnetic body 43. Magnet 41 has a form of a rectangular solid. A surface on the front side having the N-pole is defined as magnetic pole face 41A, and a surface on the rear side having the S-pole is defined as magnetic pole face 41B. Desirably, magnet 31 and magnet 41 have a same configuration to reduce a number of types of components.

Magnetic body 42 and magnetic body 43 are L-shaped magnetic bodies. One of distal ends of magnetic body 42 and one of distal ends of magnetic body 43 are attracted to magnet 41. The other distal end of magnetic body 42 and the other distal end of magnetic body 43 are opposed to central yoke 50. The dimensions in the up-and-down direction (thickness) of magnetic body 42 and magnetic body 43 are as large as that of magnet 41. Desirably, magnetic bodies 32, 33, 42, and 43 have a same configuration to reduce a number of types of components.

A surface of magnetic body 42 attracted to magnetic pole face 41A of magnet 41 is defined as attraction surface 42A. A surface of magnetic body 42 opposed to side surface 51B of central yoke 50 is defined as side surface 42B. A surface of magnetic body 42 opposed to plane 62A of auxiliary yoke 62 is defined as opposing surface 42C. Side surface 42B and opposing surface 42C are planar.

Similarly, a surface of magnetic body 43 attracted to magnetic pole face 41B of magnet 41 is defined as attraction surface 43A. A surface of magnetic body 43 opposed to side surface 52B of central yoke 50 is defined as side surface 43B. A surface of magnetic body 43 opposed to plane 62A of auxiliary yoke 62 is defined as opposing surface 43C. Side surface 43B and opposing surface 43C are planar.

[First State and Second State]

In the first state, magnetic member 30 and magnetic member 40 are located on the right side as illustrated in FIG. 3, and opposing surface 32C and opposing surface 33C of magnetic member 30 are in contact with plane 61A of auxiliary yoke 61. Meanwhile, side surface 32B is separated from side surface 51A of central yoke 50 and side surface 33B is separated from side surface 52A of central yoke 50.

Opposing surface 42C and opposing surface 43C of magnetic member 40 are separated from plane 62A of auxiliary yoke 62. Side surface 42B is in contact with side surface 51B of central yoke 50 and side surface 43B is in contact with side surface 52B of central yoke 50.

In the second state, magnetic member 30 and magnetic member 40 are located on the left side as illustrated in FIG. 4, and opposing surface 32C and opposing surface 33C of magnetic member 30 are separated from plane 61A of auxiliary yoke 61. Meanwhile, side surface 32B is in contact with side surface 51A of central yoke 50. Side surface 33B is in contact with side surface 52A of central yoke 50.

Opposing surface 42C and opposing surface 43C of magnetic member 40 are in contact with plane 62A of auxiliary yoke 62. Side surface 42B is separated from side surface 51B of central yoke 50. Side surface 43B is separated from side surface 52B of central yoke 50.

[Configuration of Magnetic Members 30 and 40]

Figure 5:
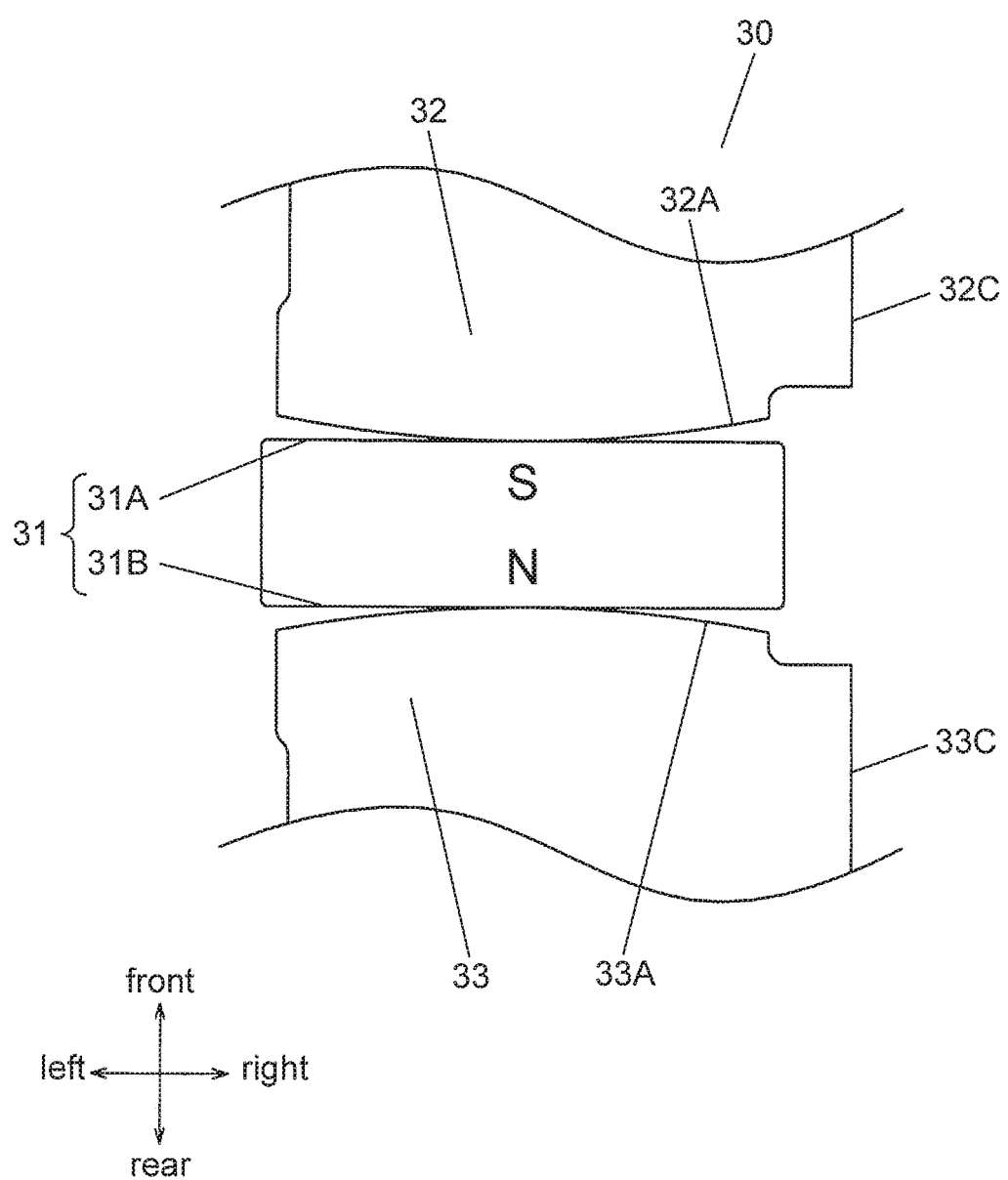
FIG. 5 is a partially enlarged view of a magnetic member according to the exemplary embodiment.
Figure 6:
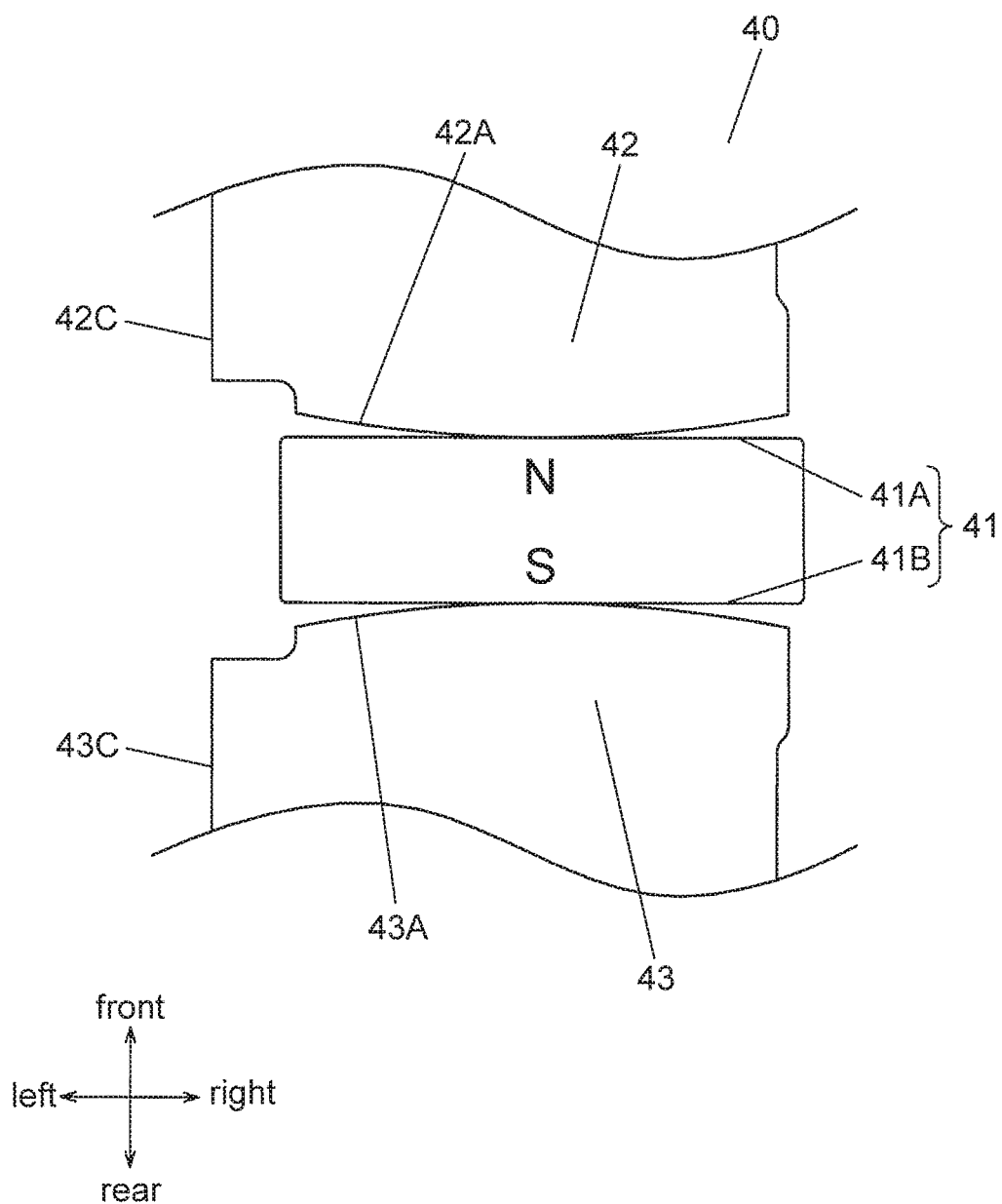
FIG. 6 is a partially enlarged view of a magnetic member according to the exemplary embodiment.

Preferably, as illustrated in FIGS. 5 and 6, attraction surfaces 32A and 33A of magnetic members 30 and 40 each have an arc shape that slightly protrudes toward magnet 31 in a top view. Preferably, in a similar manner, attraction surfaces 42A and 43A each have an arc shape that slightly protrudes toward magnet 41 in a top view. Magnetic body 32 and magnetic body 33 are preferably rotatable with respect to magnet 31. Magnetic body 42 and magnetic body 43 are preferably rotatable with respect to magnet 41. This will be described below in detail.

FIG. 5 is a partially enlarged view of magnetic member 30. Attraction surface 32A of magnetic body 32 has an arc shape slightly protruding to the rear side in a top view. Attraction surface 33A has an are shape slightly protruding to the front side in a top view.

The arc is illustrated to protrude larger than it really is for convenience of explanation.

Magnetic body 32 and magnetic body 33 are supported by drive member 24 (see FIG. 2) so as to be rotatable with respect to magnet 31. More specifically, magnetic body 32 is rotatable about a contact point between attraction surface 32A and magnetic pole face 31A in a state of being attracted to magnet 31. Magnetic body 33 is rotatable about a contact point between attraction surface 33A and magnetic pole face 31B in a state of being attracted to magnet 31.

FIG. 6 is a partially enlarged view of magnetic member 40. Attraction surface 42A of magnetic body 42 has an arc shape slightly protruding to the rear side in a top view. Attraction surface 43A has an are shape slightly protruding to the front side in a top view. The arc is illustrated to protrude larger than it really is for convenience of explanation.

Magnetic body 42 and magnetic body 43 are supported by drive member 24 (see FIG. 2) so as to be rotatable with respect to magnet 41. More specifically, magnetic body 42 is rotatable about a contact point between attraction surface 42A and magnetic pole face 41A in a state of being attracted to magnet 41. Magnetic body 43 is rotatable about a contact point between attraction surface 43A and magnetic pole face 41B in a state of being attracted to magnet 41.

Attraction surfaces 32A, 33A, 42A, and 43A need not have an arc shape. Each of attraction surfaces 32A and 33A may have any curved shape that protrudes toward magnet 31 in a top view. Similarly, each of attraction surfaces 42A and 43A may have any curved shape that protrudes toward magnet 41 in a top view.

At least one of attraction surface 32A of magnetic body 32 and attraction surface 33A of magnetic body 33 is required to have a curved shape.

Power generation device 200 according to the present exemplary embodiment is configured as described above. In power generation device 200 thus configured, a gap is hardly generated between central yoke 50 and magnetic member 30. A gap is also hardly generated between central yoke 50 and magnetic member 40.

[Description on Operation of Magnetic Members 30 and 40]

Figure 7:
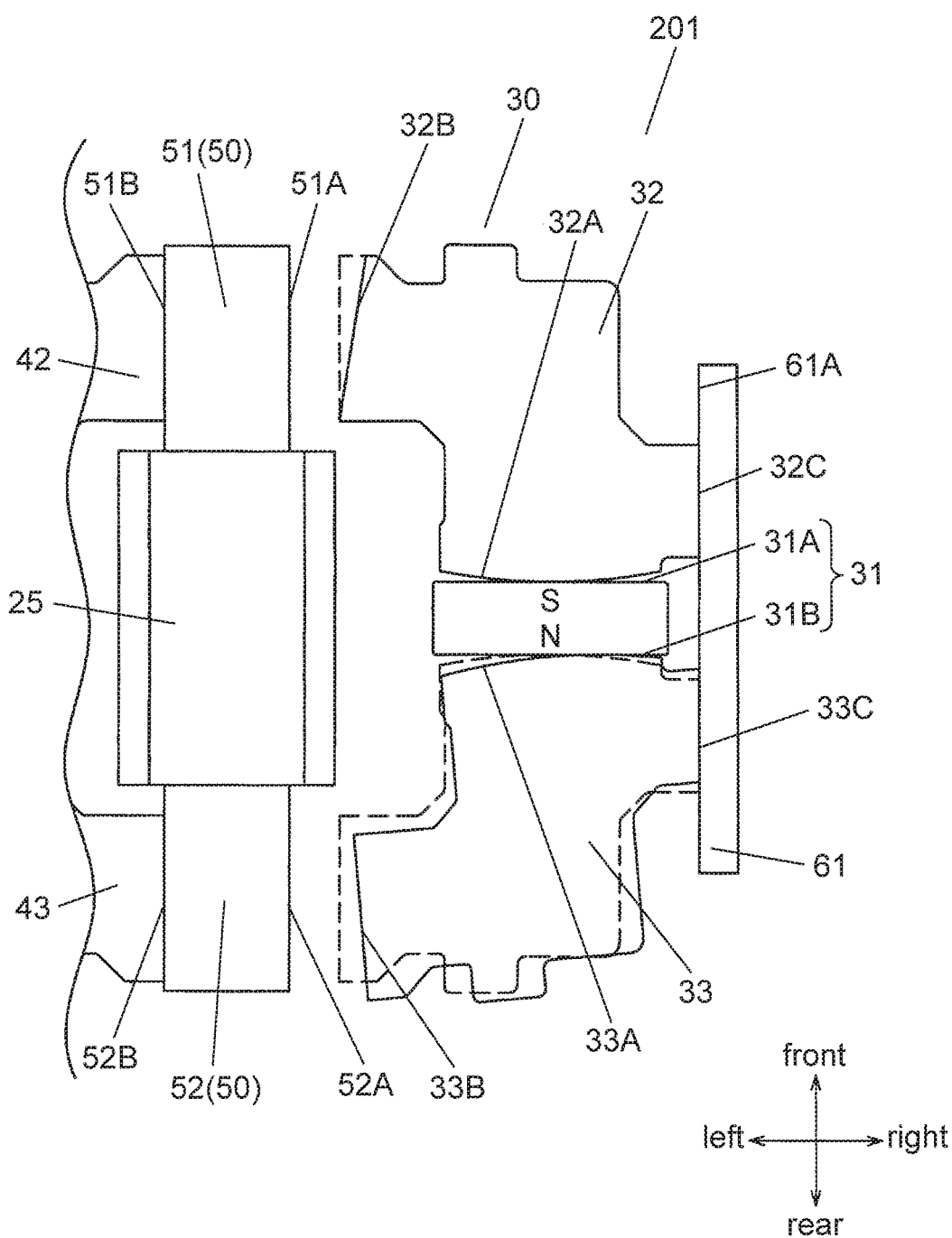
FIG. 7 is a view for describing an operation of a magnetic body of the magnetic member.
Figure 8:
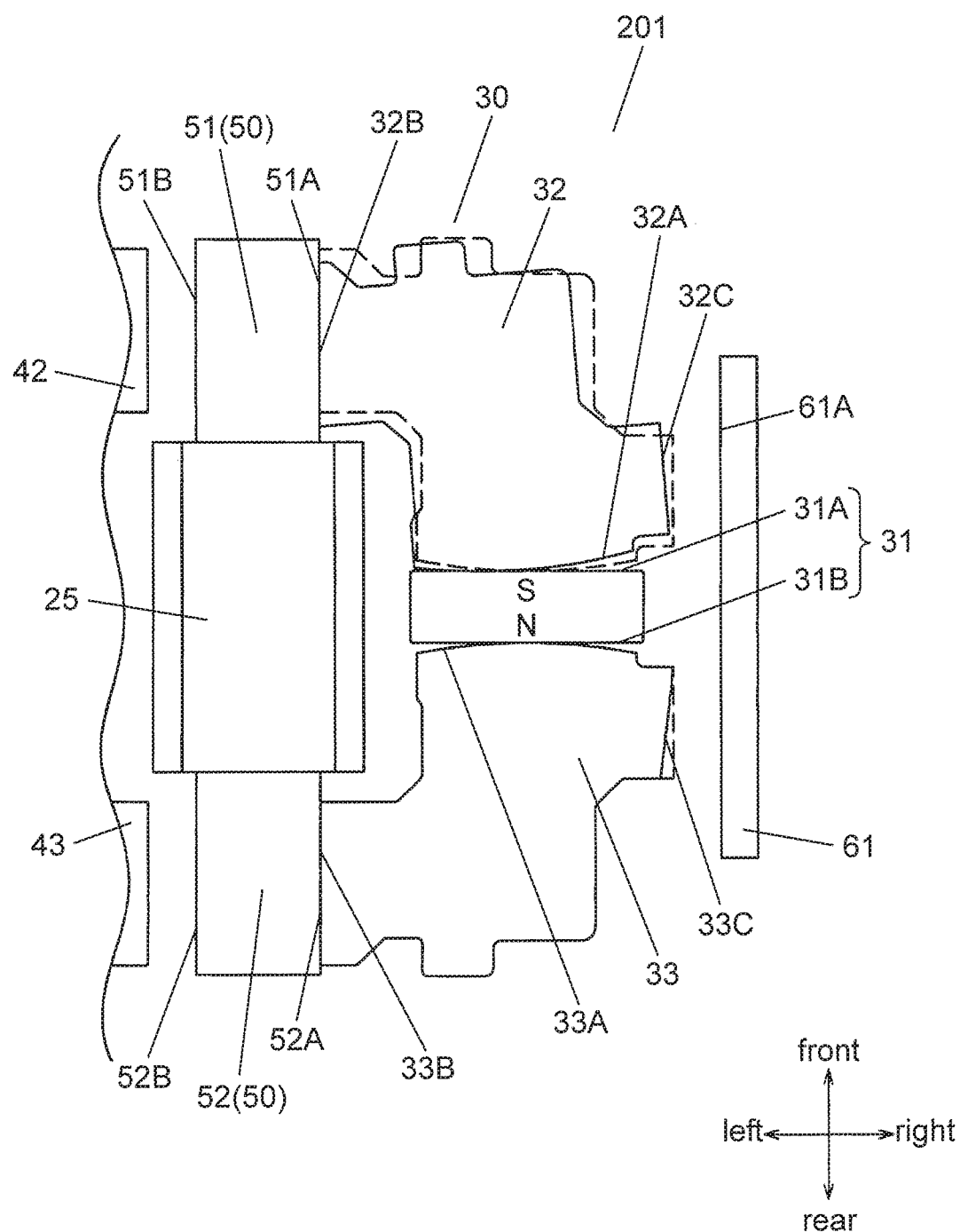
FIG. 8 is a view for describing the operation of the magnetic body of the magnetic member.

With reference to FIGS. 7 and 8, a reason why a gap is hardly generated between central yoke 50 and magnetic member 30 will now be described. FIGS. 7 and 8 are views for describing operations of magnetic bodies 32 and 33 of magnetic member 30. FIG. 7 corresponds to the first state and FIG. 8 corresponds to the second state. In the present exemplary embodiment, description is made assuming a case where side surface 32B of magnetic body 32 is processed to be inclined with respect to opposing surface 32C as illustrated in FIGS. 7 and 8. Moreover, description is made assuming a case where side surface 33B of magnetic body 33 is processed to be inclined with respect to opposing surface 33C.

Dashed lines in FIGS. 7 and 8 show shapes of magnetic body 32 and magnetic body 33 which are finished as designed. As illustrated in FIGS. 7 and 8, side surface 32B of magnetic body 32 is inclined with respect to the designed shape. Opposing surface 33C of magnetic body 33 is inclined with respect to the designed shape. For convenience of explanation, the inclination of each of side surface 32B and opposing surface 33C is illustrated larger than it really is in FIGS. 7 and 8.

As illustrated in FIG. 7, in the first state, magnetic member 30 is in contact with auxiliary yoke 61. Since opposing surface 32C of magnetic body 32 and plane 61A of auxiliary yoke 61 are planar, opposing surface 32C and plane 61A are in contact with each other without any gap. In other words, opposing surface 32C and plane 61A are parallel to each other. In this state, side surface 32B of magnetic body 32 is not parallel to side surface 51A of central yoke 50.

Magnetic body 33, which is rotatably supported with respect to magnet 31, is inclined to allow opposing surface 33C to be parallel to plane 61A and to make contact with plane 61A without any gap.

Now, drive member 24 (see FIG. 2) is moved to the left to cause the state of magnetic circuit 201 to transition from the first state to the second state illustrated in FIG. 8. Magnetic body 32 and magnetic body 33 are rotatably supported with respect to magnet 31. Thus, magnetic body 32 can rotate to allow side surface 32B to be parallel to side surface 51A of central yoke 50. Similarly, magnetic body 33 can rotate to allow side surface 33B to be parallel to side surface 51A.

In the second state, as illustrated in FIG. 8, magnetic body 32 rotates to allow side surface 32B to be parallel to side surface 51A and to make contact with side surface 51A without any gap. Similarly, magnetic body 33 rotates to allow side surface 33B to be parallel to side surface 52A and to make contact with side surface 52A without any gap.

In this state, opposing surface 32C is not parallel to plane 61A of auxiliary yoke 61. Opposing surface 33C is also not parallel to plane 61A of auxiliary yoke 61.

When drive member 24 (see FIG. 2) is moved to the right to cause the state of magnetic circuit 201 to transition from the second state again to the first state, magnetic body 32 and magnetic body 33 also rotate with respect to magnet 31. As illustrated in FIG. 7, each of opposing surface 32C of magnetic body 32 and opposing surface 33C of magnetic body 33 makes contact with plane 61A of auxiliary yoke 61 without any gap. Auxiliary yoke 61 is disposed so as to be opposed to magnetic body 32 and magnetic body 33.

Magnetic body 32 has opposing surface 32C that is opposed to auxiliary yoke 61, and magnetic body 33 has opposing surface 33C that is opposed to auxiliary yoke 61.

SUMMARY

As described above, in power generation device 200 according to the present exemplary embodiment, magnetic body 32 and magnetic body 33 can rotate to correct, along the rotating direction, the position of surfaces that make contact with central yoke 50. That is, in power generation device 200, a gap is hardly generated between magnetic member 30 and central yoke 50. Thus, power generation device 200 can increase the density of the magnetic flux flowing through central yoke 50, thereby keeping fluctuation of change in the magnetic flux during power generation small to provide stable power generation.

As described above, each of attraction surface 32A of magnetic body 32 and attraction surface 33A of magnetic body 33 is required to have an arc shape slightly protruding toward magnet 31 in a top view. With each attraction surface has an arc shape, as illustrated in FIGS. 7 and 8, either in the first state or the second state, the gap between attraction surface 32A and magnetic pole face 31A does not greatly change and the gap between attraction surface 33A and magnetic pole face 31B does not greatly change. The magnetic flux of magnet 31 is therefore efficiently and stably introduced into magnetic body 32 and magnetic body 33. That is, power generation device 200 according to the present exemplary embodiment is capable of reducing leakage of magnetic flux in the magnetic circuit (magnetic circuit 201), thereby keeping fluctuation of change in the magnetic flux during power generation small to provide stable power generation.

The operation in the case where side surface 32B and opposing surface 32C of magnetic body 32 are not parallel is described above. However, a technical idea of the present disclosure is not limited to the above description.

For example, the technical idea of the present disclosure is applicable to power generation device 200 in which central yoke 50 and auxiliary yoke 61 are disposed so as to be inclined with respect to magnetic member 30 due to assembly tolerances. Furthermore, the technical idea is applicable to a case where a contact surface (side surface 51A or side surface 52A) of central yoke 50 that makes contact with magnetic member 30 is processed to be inclined with respect the designed shape. The technical idea is also applicable to a case where plane 61A of auxiliary yoke 61 is processed to be inclined with respect the designed shape.

In such cases as well, in power generation device 200, magnetic body 32 and magnetic body 33 rotate with respect to magnet 31. Rotation of magnetic body 32 and magnetic body 33 corrects, along the rotating direction, a position of a contact surface (side surface 32B or side surface 33B) to central yoke 50 disposed with inclination. Thus, a gap is hardly generated between magnetic member 30 and central yoke 50.

The same is applied to auxiliary yoke 61. Rotation of magnetic body 32 and magnetic body 33 corrects, along the rotating direction, a position of a contact surface (opposing surface 32C or opposing surface 33C). Thus, a gap is hardly generated between magnetic member 30 and auxiliary yoke 61.

It is not always required that both the magnetic body 32 and magnetic body 33 are rotatable with respect to magnet 31. Only one of magnetic body 32 and magnetic body 33 may be rotatable with respect to magnet 31. In such a case, for example, attraction surface 33A of magnetic body 33 and magnetic pole face 31B of magnet 31 may be disposed parallel to each other and may be fixed to each other by adhesives. Magnetic body 33 may be supported by drive member 24 to integrally rotate with magnet 31. In this configuration, magnetic body 33 and magnet 31 integrally rotate to correct the position of the contact surface (side surface 32B and side surface 33B) of magnetic member 30 that makes contact with central yoke 50.

Although magnetic member 30 makes contact with central yoke 50 in the configuration described above, the technical idea of the present disclosure includes, for example, a state in which side surface 32B and side surface 51A are parallel and in close proximity to each other. Similarly, the technical idea of the present disclosure includes a state in which side surface 33B and side surface 52A are parallel and in close proximity to each other.

Although magnetic member 30 makes contact with auxiliary yoke 61 in the configuration described above, magnetic member 30 is not always required to make contact with auxiliary yoke 61. That is, power generation device 200 may have any configuration in which magnetic member 30 and auxiliary yoke 61 are attracted to each other and are in close proximity to each other. For example, the right-and-left movement of drive member 24 (see FIG. 2) may be restricted by, for example, lower case 21 to generate a slight gap between opposing surface 32C and plane 61A or between opposing surface 33C and plane 61A. That is, magnetic members 30 (opposing surface 32C and opposing surface 33C) may not make contact with auxiliary yoke 61 but may be in close proximity to auxiliary yoke 61. Such a configuration provides a collateral effect of reducing collision sounds generated by magnetic member 30 contacting auxiliary yoke 61.

Magnetic member 40 is configured in a similar manner as described above, and therefore illustration and detailed description are omitted. In this case, magnetic body 42 and magnetic body 43 rotate with respect to magnet 41. This rotation allows side surface 42B of magnetic member 40 to make contact with side surface 51B of central yoke 50 without any gap and side surface 43B of magnetic member 40 to make contact with side surface 52B of central yoke 50 without any gap in the first state.

In the second state, each of opposing surfaces 42C and 43C of magnetic member 40 makes contact with plane 62A of auxiliary yoke 62 without any gap.

If a film or the like is formed on a surface of a magnetic body or a magnet, the film or the like may be defined as a portion of the magnetic body or the magnet, or the film may be defined as a member different from the magnetic body or the magnet.

Modification of Exemplary Embodiment

Figure 9:
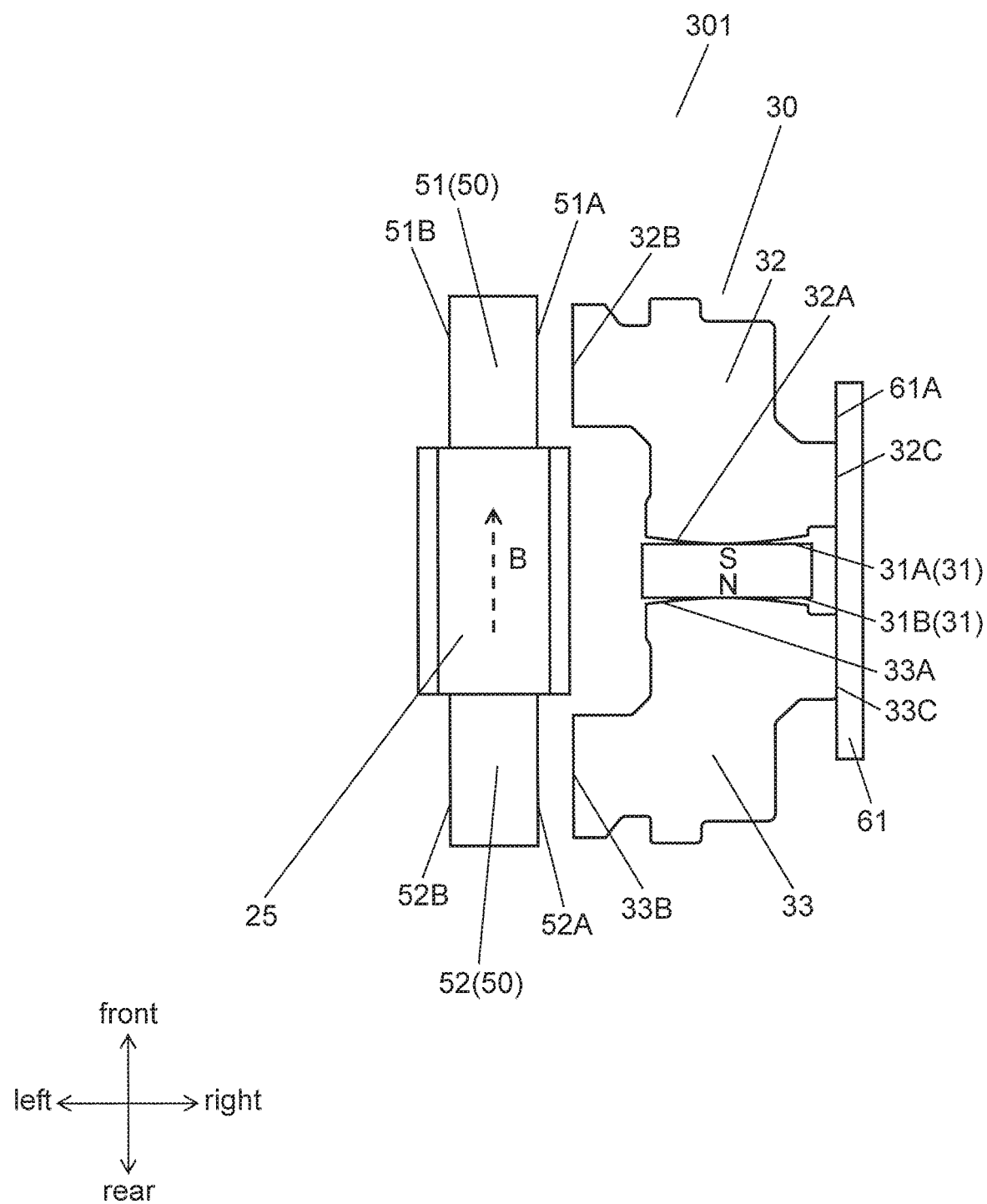
FIG. 9 illustrates a first state of a magnetic circuit according to a modification of the exemplary embodiment.
Figure 10:
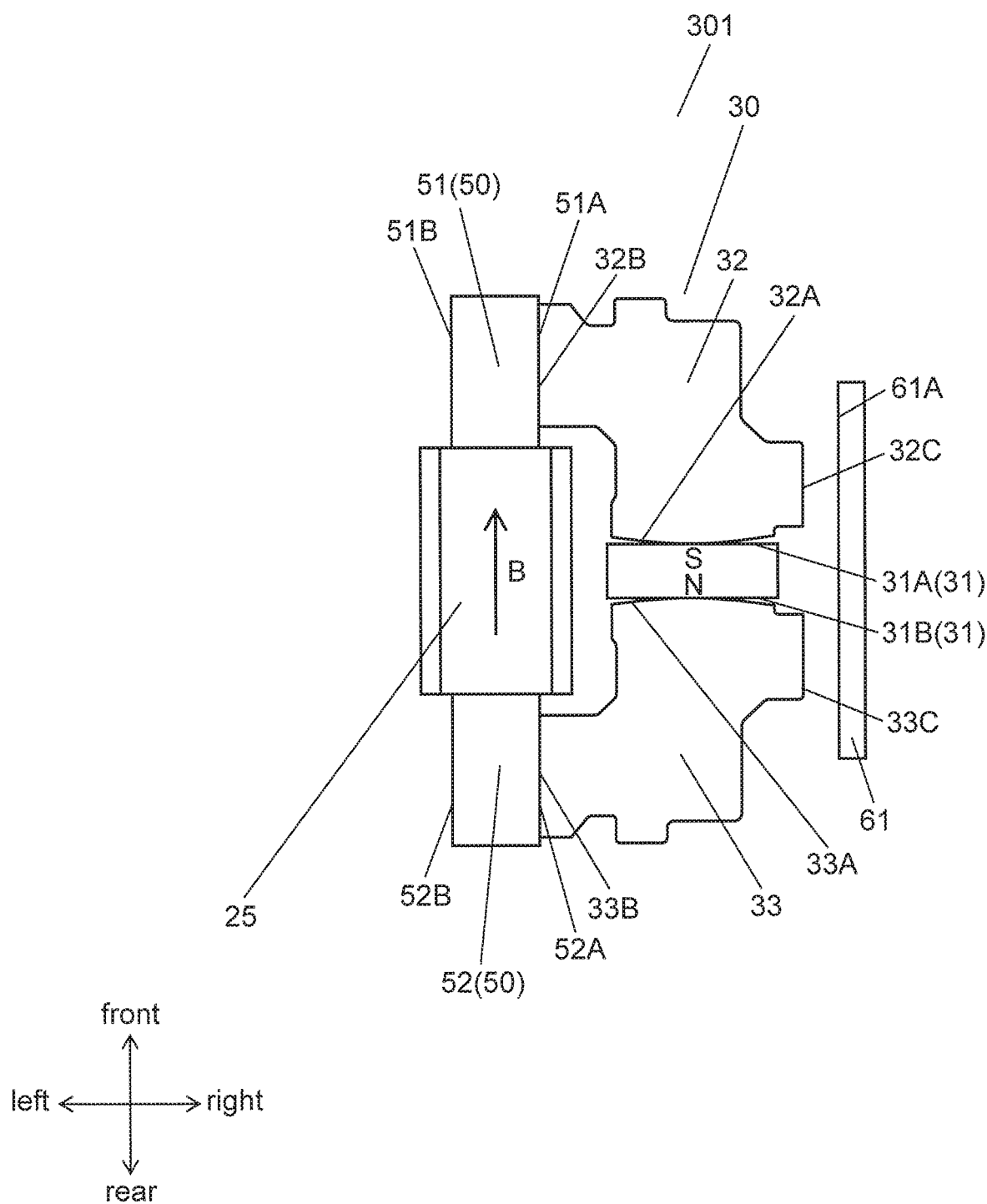
FIG. 10 illustrates a second state of the magnetic circuit according to the modification of the exemplary embodiment.
Figure 11:
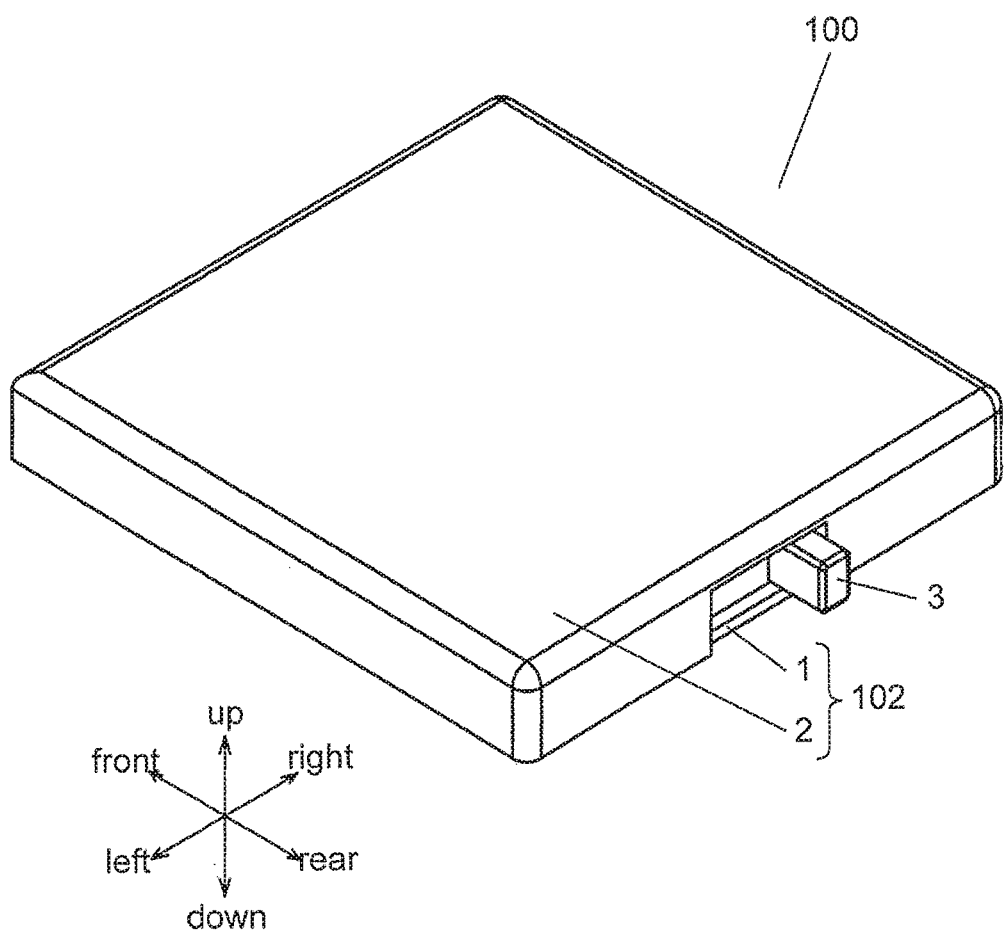
FIG. 11 is an external perspective view of a conventional power generation device.
Figure 12:
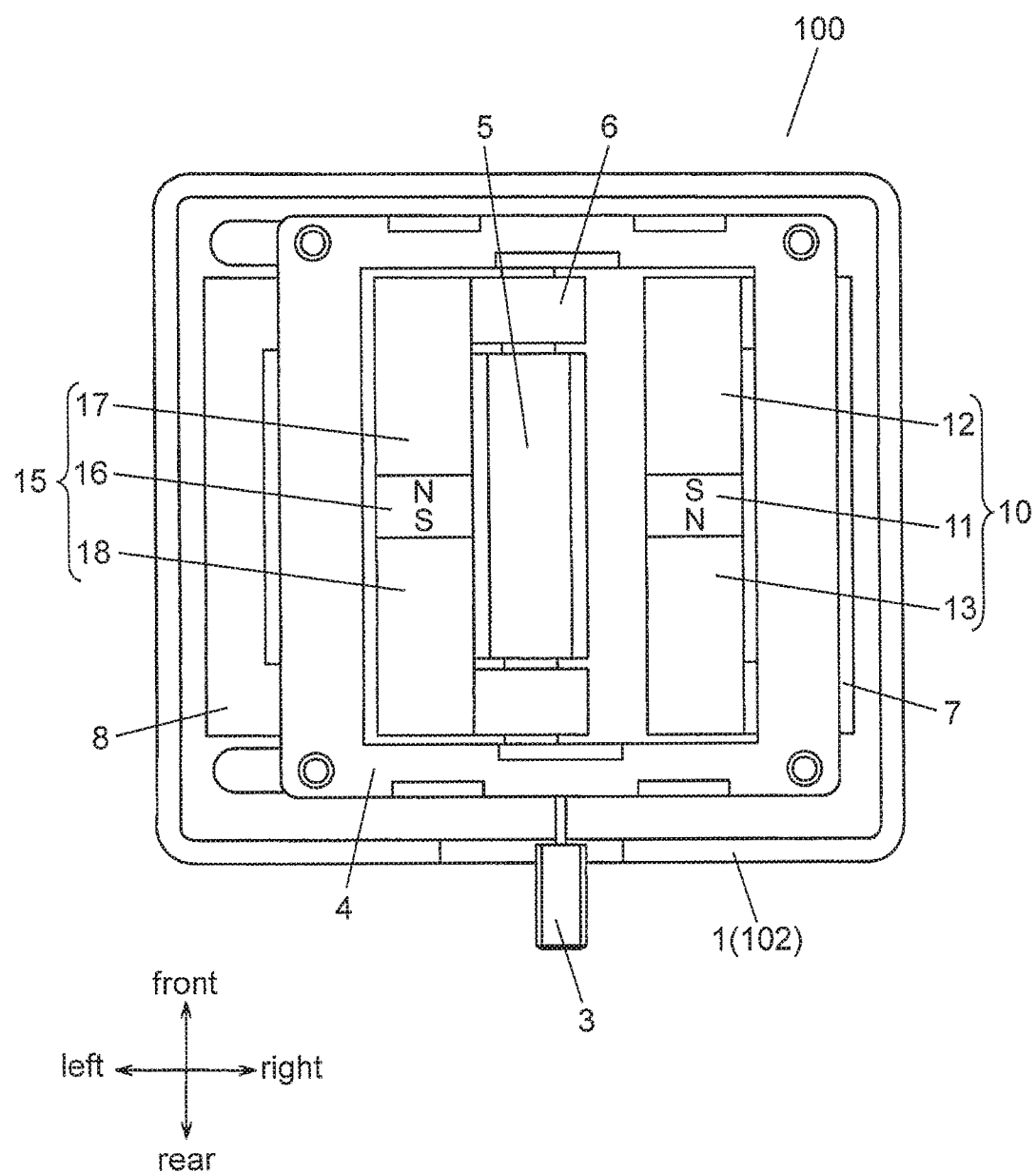
FIG. 12 is a top view of the conventional power generation device with a case removed.

An exemplary modification of the magnetic body of the disclosure will now be described with reference to FIGS. 9 and 10. FIG. 9 illustrates a first state of magnetic circuit 301, which is a modification of the exemplary embodiment according to the present disclosure. FIG. 10 illustrates a second state of magnetic circuit 301, which is the modification of the exemplary embodiment according to the present disclosure.

Power generation device 200 described with reference to FIGS. 1 to 8 includes magnetic member 30 disposed on the right side of central yoke 50 and magnetic member 40 disposed on the left side of central yoke 50.

However, it is not always necessary to provide two magnetic members 30 and 40. As illustrated in FIGS. 9 and 10, magnetic member 40 may not be provided and only magnetic member 30 may be provided. That is, only one magnetic member (for example, magnetic member 30) may be provided in one of the sides of central yoke 50. For the modification illustrated in FIGS. 9 and 10, the component same as the exemplary embodiment is denoted with the same reference mark and detailed description thereof is omitted.

A flow of a magnetic flux of magnetic circuit 301 of the modification illustrated in FIGS. 9 and 10 will now briefly be described.

In the first state, magnetic member 30 is not in contact with central yoke 50 as illustrated in FIG. 9. Thus, in the first state, an influence of magnetic member 30 on central yoke 50 is small, and therefore density of a magnetic flux flowing through central yoke 50 in a direction indicated by arrow B as illustrated in FIG. 9 is very small.

In the second state, magnetic member 30 is attracted to central yoke 50 as illustrated in FIG. 10. That is, magnetic member 30 is in contact with central yoke 50. In the second state, the density of the magnetic flux flowing through central yoke 50 in the direction indicated by arrow B in FIG. 10 is larger than that of the first state. In this manner, the density of magnetic flux flowing through central yoke 50 changes by the transition from the first state to the second state. This generates an electromotive force in coil 25.

As can be understood from the above, the power generation device according to the present disclosure does not always require two magnetic members 30 and 40. The technical idea of the present disclosure is applicable to a configuration having one magnetic member 30.

Terms for indicating directions, such as "up", "down", "front", "rear", "left", and "right", are used in the present exemplary embodiment merely by means of indicating relative positional relationship, not by way of limitations.

That is, power generation device 200 according to the present disclosure includes central yoke 50 around which coil 25 is wound, central yoke 50 having side surface 51A located on the front side with respect to coil 25 and side surface 52A located on the rear side with respect to coil 25. Furthermore, power generation device 200 according to the present disclosure includes magnetic body 32 including side surface 32B that makes contact with or separates from side surface 51A of central yoke 50, magnetic body 33 including side surface 33B that makes contact with or separates from side surface 52A of central yoke 50, and a magnet including magnetic pole face 31A and magnetic pole face 31B that has a magnetic pole (N-pole) different from a magnetic pole (S-pole) of magnetic pole face 31A.

Magnetic pole face 31A of magnet 31 is attracted to attraction surface 32A of magnetic body 32, and magnetic pole face 31B of magnet 31 is attracted to attraction surface 33A of magnetic body 33. At least one of magnetic body 32 and magnetic body 33 rotates in a state of being attracted to magnet 31.

INDUSTRIAL APPLICABILITY

A power generation device according to the present disclosure provides stable power generation with small fluctuation.

The power generation device according to the present disclosure is applicable to electronic devices.

REFERENCE MARKS IN THE DRAWINGS

1: lower case
2: upper case
3: knob
4: drive member
5: coil
6: central yoke
7, 8: auxiliary yoke
10, 15: magnetic member
11, 16: magnet
12, 13, 17, 18: magnetic body
21: lower case
22: upper case
23: knob
24: drive member
25: coil
30, 40: magnetic member
31, 41: magnet
31A, 31B, 41A, 41B: magnetic pole face
32, 33, 42, 43: magnetic body
32A, 33A, 42A, 43A: attraction surface
32B, 33B, 42B, 43B: side surface
32C, 33C, 42C, 43C: opposing surface
50: central yoke
51: front portion
52: rear portion
51A, 51B, 52A, 52B: side surface
61, 62: auxiliary yoke
61A, 62A: plane
100, 200: power generation device
101, 201, 301: magnetic circuit
102, 202: housing

The invention claimed is:

1. A power generation device comprising:
a yoke having a first end portion, a second end portion and a center portion around which a coil is wound, the center portion being located between the first end portion and the second end portion in an extending axis of the yoke, the yoke having a first side surface and a second side surface opposite to the first side surface, the coil covering a part of the first side surface and a part of the second side surface;
a first magnetic body including a side surface to be in contact with the first side surface of the first end portion of the yoke;
a second magnetic body including a side surface to be in contact with the first side surface of the second end portion of the yoke;
a first magnet including a first magnetic pole face and a second magnetic pole face that has a magnetic pole different from a magnetic pole of the first magnetic pole face; and
a drive member that supports the first magnet, the first magnetic body, and the second magnetic body and moves together with the first magnet, the first magnetic body, and the second magnetic body,
wherein the first magnetic pole face of the first magnet is attracted to an attraction surface of the first magnetic body,
the second magnetic pole face of the first magnet is attracted to an attraction surface of the second magnetic body, and
the drive member supports the first magnet, the first magnetic body, and the second magnetic body so that the first magnetic body rotates on the first magnetic pole face in a state of being attracted to the first magnetic pole face when the side surface of the first magnetic body is not in contact with the first side surface of the first end portion of the yoke, and the second magnetic body rotates on the second magnetic pole face in a state of being attached to the second magnetic pole face when the side surface of the second magnetic body is not in contact with the first side surface of the second end portion of the yoke.

2. The power generation device according to claim 1, wherein the attraction surface of each of the first magnetic body and the attraction surface of the second magnetic body has a curved shape protruding toward the first magnet.

3. The power generation device according to claim 1, wherein
each of the first side surface of the first end portion of the yoke and the side surface of the first magnetic body is planar, and
the first side surface of the first end portion of the yoke and the side surface of the first magnetic body are parallel to each other in a state where the side surface of the first magnetic body is in contact with the first side surface of the first end portion of the yoke.

4. The power generation device according to claim 1, wherein
each of the first side surface of the second end portion of the yoke and the side surface of the second magnetic body is planar, and
the first side surface of the second end portion of the yoke and the side surface of the second magnetic body are parallel to each other in a state where the side surface of the second magnetic body is in contact with the first side surface of the second end portion of the yoke.

5. The power generation device according to claim 1, wherein the drive member is configured such that a first slide movement of the drive member makes the first magnetic body and the second magnetic body make contact with the yoke and a second slide movement of the drive member makes the first magnetic body and the second magnetic body separate from the yoke.

6. The power generation device according to claim 1, further comprising an auxiliary yoke disposed so as to be opposed to the first magnetic body and the second magnetic body,
wherein the first magnetic body has an opposing surface that is opposed to the auxiliary yoke, and
the second magnetic body has an opposing surface that is opposed to the auxiliary yoke.

7. The power generation device according to claim 1, further comprising:
a third magnetic body including a side surface to be in contact with the second side surface of the first end portion of the yoke;
a fourth magnetic body including a side surface to be in contact with the second side surface of the second end portion of the yoke; and
a second magnet including a first magnetic pole face and a second magnetic pole face that has a magnetic pole different from a magnetic pole of the first magnetic pole face,
wherein the first magnetic pole face of the second magnet is attracted to an attraction surface of the fourth magnetic body,
the second magnetic pole face of the second magnet is attracted to an attraction surface of the third magnetic body, and
the third magnetic body rotates on the first magnetic pole face of the second magnet in a state of being attracted to first magnetic pole face of the second magnet, and the fourth magnetic body rotates on the second magnetic pole face of the second magnet in a state of being attached to the second magnetic pole face of the second magnet.

8. The power generation device according to claim 1, wherein a part of the first side surface of the yoke with which the side surface of the first magnetic body is to be in contact with, a part of the first side surface of the yoke with which the side surface of the second magnetic body is to be in contact with and the part of the first side surface of the yoke covered by the coil are on a same plane.

9. The power generation device according to claim 1, wherein, when the side surface of first magnetic body is in contact with the first side surface of the first end portion of the yoke and the side surface of the second magnetic body is in contact with the first side surface of the second end portion of the yoke, a part of the coil is located between the side surface of the first magnetic body and the side surface of the second magnetic body.

* * * * *